(12) United States Patent
Bretschneider et al.

(10) Patent No.: US 11,268,587 B2
(45) Date of Patent: Mar. 8, 2022

(54) ACTIVE VIBRATION DAMPER, USABLE IN A PLURALITY OF ORIENTATIONS

(71) Applicant: SIEMENS AKTIENGESELLSCHAFT, Munich (DE)

(72) Inventors: Jochen Bretschneider, Owingen (DE); Christoph Fritsch, Pommersfelden (DE); Torsten Schür, Erlangen (DE); Dietmar Stoiber, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/286,251

(22) PCT Filed: Sep. 18, 2019

(86) PCT No.: PCT/EP2019/074944
§ 371 (c)(1),
(2) Date: Apr. 16, 2021

(87) PCT Pub. No.: WO2020/078648
PCT Pub. Date: Apr. 23, 2020

(65) Prior Publication Data
US 2021/0356013 A1 Nov. 18, 2021

(30) Foreign Application Priority Data
Oct. 18, 2018 (EP) .................................. 18201240

(51) Int. Cl.
*F16F 7/10* (2006.01)
*F16F 7/116* (2006.01)
*F16F 1/26* (2006.01)

(52) U.S. Cl.
CPC ............ *F16F 7/1011* (2013.01); *F16F 7/116* (2013.01); *F16F 2222/08* (2013.01)

(58) Field of Classification Search
CPC ....... F16F 7/1011; F16F 7/116; F16F 2222/08
See application file for complete search history.

(56) References Cited

U.S. PATENT DOCUMENTS

| 4,710,656 A | * | 12/1987 | Studer | ..................... F16F 15/03 |
| | | | | 188/267 |
| 5,196,745 A | | 3/1993 | Trumper | |

(Continued)

FOREIGN PATENT DOCUMENTS

| EP | 2708316 A1 | * | 3/2014 | ............ F16F 7/1011 |
| WO | WO-9727408 A1 | * | 7/1997 | .............. F16F 7/116 |

(Continued)

OTHER PUBLICATIONS

PCT International Search Report and Written Opinion of International Searching Authority dated Nov. 22, 2019 corresponding to PCT International Application No. PCT/EP 2019/074944 filed Sep. 18, 2019.

*Primary Examiner* — Melody M Burch
(74) *Attorney, Agent, or Firm* — Henry M. Feiereisen LLC

(57) ABSTRACT

An active vibration damper includes a lower outer wall for placement on a floor, and front and rear outer walls, with the front and/or rear outer wall including first and second receptacles in an outer side thereof. The first receptacle receives a permanent magnet and is pot-shaped to maintain a closed configuration of the front and/or rear outer wall. A primary part of an electrical linear actuator is fixed at least on an inside of the lower outer wall, and a secondary part is arranged above the primary part and acted upon by the primary part. Retaining elements fixed to an inside of the upper outer wall movably hold the secondary part for (Continued)

displacement in a substantially linear manner in a left-right direction when the primary part is correspondingly impinged on. A magnetic back iron yoke is received in the second receptacle at the height of the secondary part.

4 Claims, 3 Drawing Sheets

(56) References Cited

U.S. PATENT DOCUMENTS

2009/0122284 A1 5/2009 Butler et al.
2019/0047103 A1 2/2019 Haschka et al.

FOREIGN PATENT DOCUMENTS

| WO | WO-2005005857 A1 | * | 1/2005 | ............ F16F 15/073 |
| WO | WO-2017140760 A1 | * | 8/2017 | ............ F16F 7/1011 |
| WO | WO 2017140760 A1 | | 8/2017 | |

* cited by examiner

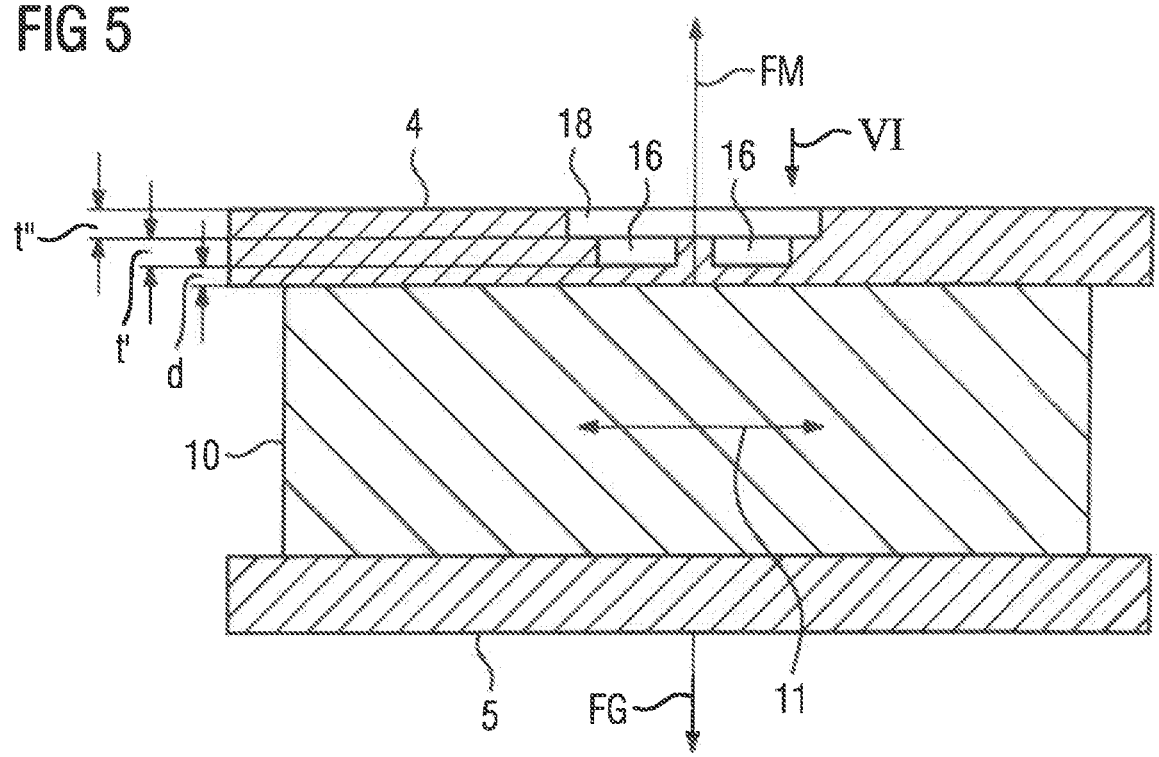
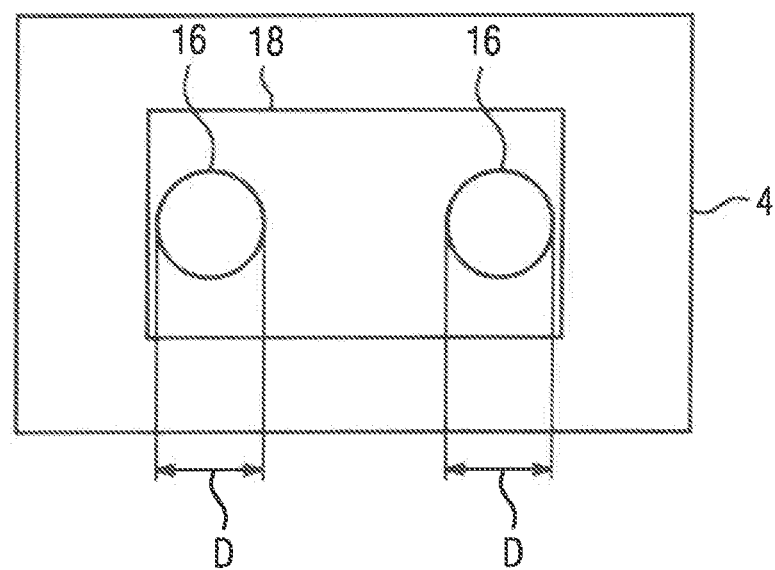

ACTIVE VIBRATION DAMPER, USABLE IN A PLURALITY OF ORIENTATIONS

CROSS-REFERENCES TO RELATED APPLICATIONS

This application is the U.S. National Stage of International Application No. PCT/EP2019/074944, filed Sep. 18, 2019, which designated the United States and has been published as international Publication No. WO 2020/078648 A1 and which claims the priority of European Patent Application, Serial No. 18201240.1, filed Oct. 18, 2018, pursuant to 35 U.S.C. 119(a)-(d).

BACKGROUND OF THE INVENTION

The present invention is based on an active vibration damper,
wherein the vibration damper has a substantially cuboid housing, such that the housing, when positioned with a lower outer wall on the floor, additionally has an upper outer wall, a front and a rear outer wall, and a left and a right outer wall,
wherein a primary part of an electrical linear actuator is fixed at least on the inside of the lower outer wall,
wherein the primary part acts on a secondary part of the electrical linear actuator, arranged above the primary part,
wherein the secondary part is movably held via a left and a right retaining element, fixed to the inside of the upper outer wall, such that the secondary part is displaceable in a substantially linear manner when the primary part is correspondingly impinged on in the left-right direction,
wherein a number of receptacles for permanent magnets and, furthermore, a receptacle for a magnetic back iron yoke are introduced into the front outer wall and/or into the rear outer wall at the height of the secondary part,
wherein the receptacles for the permanent magnets and the receptacle for the magnetic back iron yoke are introduced into the outside of the front outer wall and/or into the outside of the rear outer wall.

An active vibration damper is known from WO 2017/140 760 A1 which appears to have a substantially cuboid housing, such that the housing, when positioned with a lower outer wall on the floor, additionally appears to have an upper outer wall, a front and a rear outer wall, and a left and a right outer wall. A primary part of an electrical linear actuator is fixed on the inside of the lower outer wall. The primary part acts on a secondary part of the electrical linear actuator, arranged above the primary part. The secondary part is movably held via a left and a right retaining element, fixed to the inside of the upper outer wall, such that the secondary part is displaceable in a substantially linear manner when the primary part is correspondingly impinged on in the left-right direction. A number of apertures are introduced into the front and the rear outer wall, into which what are known as slot gliding blocks can be inserted.

Active vibration dampers are used in various machines in order to damp vibrations arising during operation of the respective machine. The respective active vibration damper is not therefore used for the actual operation of the machine but merely to reduce and if possible even eliminate an undesired side-effect, namely the vibrations and oscillations, occurring during operation of the machine.

The vibration damper works very well. It can however only be mounted in a few orientations. It is nevertheless readily possible in particular to mount the vibration damper such that the outer wall referred to above as the lower outer wall points downward. In this case, no further measures at all are required in order to operate the vibration damper properly. Moreover, on account of the force of attraction exerted by the primary part on the secondary part, it is often also readily possible to mount the vibration damper such that the outer wall referred to above as the upper outer wall points downward. This is possible in particular if the force of attraction exerted by the primary part on the secondary part exceeds the weight force exerted on the secondary part. It is furthermore possible to mount the vibration damper such that one of the outer walls referred to above as the left and right outer wall points downward. In this case, it is necessary to equalize the weight force acting on the secondary part by actuating the primary part accordingly.

It is however not possible to mount the vibration damper such that one of the outer walls referred to above as the front and rear outer wall points downward. In this case, on account of the weight force acting on the secondary part, high bending stresses act on the retaining elements which would destroy the retaining elements immediately or at least very quickly. Under certain circumstances, therefore, the active vibration damper must be mounted such that it is spaced significantly apart from the machine, the vibration of which it is intended to damp. It cannot however be mounted such that it is effectively flush with the machine.

The object of the present invention is to develop an active vibration damper of the type cited in the introduction such that it can also be mounted such that the front and/or rear outer wall points downward.

SUMMARY OF THE INVENTION

The object is achieved with an active vibration damper as set forth hereinafter. Advantageous embodiments of the active vibration damper are the subject matter of dependent claims.

According to the invention, an active vibration damper of the type cited in the introduction is embodied such that the receptacles for the permanent magnets are designed in a pot-like manner, in particular as pot boreholes, such that the corresponding outer wall is retained as a closed outer wall despite the receptacles for the permanent magnets.

It is not necessary and in many cases not even expedient to always and in every case actually introduce the permanent magnets and the back iron yoke into the receptacles. This is because, particularly in those cases in which the lower outer wall, the left outer wall or the right outer wall and possibly also the upper outer wall point downward, it can even be counterproductive if the permanent magnets and the back iron yoke are present. It must however be possible to be able to mount the permanent magnets and the back iron yoke if required. Because the receptacles are introduced into the outside of the front and/or rear outer wall, It is possible to access the receptacles from the outside without opening the housing of the vibration damper as a whole. On account of the design as pot boreholes such that the corresponding outer walls are retained as closed outer walls, separate sealing measures, for example to protect against ingress of dust or water, are not required.

The receptacle for the back iron yoke, viewed from the inside out, is preferably arranged outside the receptacles for the permanent magnets. This results in a particularly favorable arrangement of the back iron yoke.

Insofar as a corresponding mounting of the active vibration damper is to take place, the permanent magnets and the back iron yoke are introduced into the respective receptacles of the front or the rear side wall. In this case, a resulting magnetic field strength of the magnetic circuit formed by the secondary part, the permanent magnets and the back iron yoke is preferably limited by the back iron yoke. As a result, it can in particular be achieved that the magnetic force of attraction of the magnetic circuit acting on the secondary part and compensating the weight force depends neither on the strength of the permanent magnets nor on the size of the magnetic air gap which is unavoidably present.

In order to achieve the limitation by the back iron yoke in a particularly simple manner, the back iron yoke preferably has a region with a reduced cross-section compared to the remaining back iron yoke. In this case, the reduced cross-section limits the resulting magnetic field strength.

BRIEF DESCRIPTION OF THE DRAWING

The above-described properties, features and advantages of this invention as well as the manner in which they are achieved will become clearer and more comprehensible in conjunction with the following description of the exemplary embodiments, which are explained in more detail in conjunction with the drawings. In the drawings, in schematic representation:

FIG. 5 shows the vibration damper from FIG. 3 without introduced permanent magnets and without an introduced back iron yoke, and FIG. 6 shows a top view from the outside onto the front outer wall of the vibration damper from FIG. 5 from a direction VI.

DETAILED DESCRIPTION OF PREFERRED EMBODIMENTS

Figure 1:
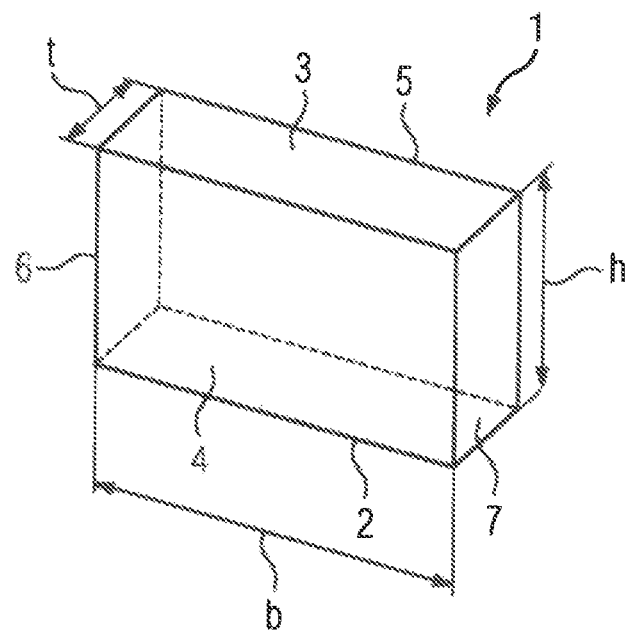
FIG. 1 shows a perspective representation of an active vibration damper from the outside.

According to the representation in FIG. 1, an active vibration damper has a housing 1. According to the representation in FIG. 1, the housing 1 is substantially cuboid. It comprises a lower outer wall 2. The other outer walls 3 to 7 of the housing 1 are accordingly referred to as upper outer wall 3, front and rear outer wall 4, 5, and left and right outer wall 6 and 7. However, these designations serve only to differentiate the various outer walls 2 to 7 of the housing 1 from one another. Specifications such as "upper", etc. relate to this definition insofar as they refer to elements of the vibration damper. The outer walls 2 to 7 typically consist of a diamagnetic metal, for example aluminum.

It is optimal if the vibration damper can be mounted on a machine such that the lower outer wall 2 points downward. It is also possible for the vibration damper to be rotated and/or tilted such that for example the right outer wall 7 points downward. "Down" in this context is the direction of the force of gravity.

Various dimensions and sizings are specified below. The dimensions and sizings relate to a specific possible embodiment of the vibration damper. They serve merely to illustrate the present invention, not however to limit it to such dimensions and sizings.

For example, the housing 1 can have a width b of approximately 30 cm, a height h of approximately 20 cm and a depth t of approximately 10 cm. A total mass of the vibration damper can in this case amount to approximately 20 kg. The outer walls 2 to 7 can have a uniform material thickness or their material thicknesses can vary. In the case of a uniform material thickness, this can for example amount to approximately 1 cm.

Figure 2:
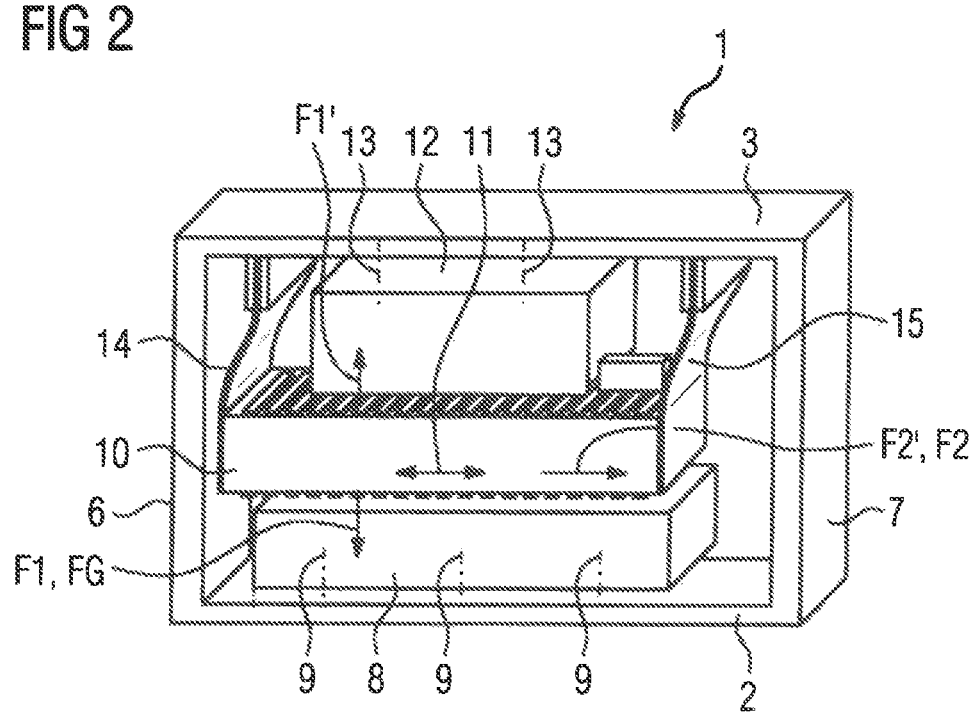
FIG. 2 shows the vibration damper from FIG. 1 without the front and rear outer wall.

According to FIG. 2, a primary part 8 of an electrical linear actuator is fixed at least on the inside of the lower outer wall 2. For example, the primary part 8 can be screwed to the lower outer wall 2 by means of screws 9 (indicated by dashed lines). Because it is arranged on the outer wall 2 referred to as the lower outer wall 2, the primary part 8 is referred to below as the lower primary part 8 in order to distinguish it from a further primary part to be introduced at a later time.

A secondary part 10 of the electrical actuator is arranged above the lower primary part 8. The word "above" means in this context that the secondary part 10 is disposed between the lower primary part 8 and the upper outer wall 3. The lower primary part 8 acts on the secondary part 10.

On the one hand, the lower primary part 8 exerts a force of attraction F1 on the secondary part 10. The primary part 8 therefore attempts, so to speak, to pull the secondary part 10 toward itself. The force of attraction F1 is preferably greater than the weight force FG acting on the secondary part 10. The force of attraction F1 is—at least substantially—independent from an actuation of the lower primary part 8. On the other hand, the lower primary part 8 exerts a pushing force F2 on the secondary part 10. The pushing force F2 acts in the direction of the double arrow 11 drawn in FIG. 2. The secondary part 10 can thereby be deflected toward the left outer wall 6 or the right outer wall 7. The pushing force F2 is dependent, in terms of its value and also in terms of its sign, on how the primary part 8 is actuated.

The force of attraction F1 always acts in the direction of the primary part 8. The pushing force F2 always acts in the direction of the double arrow 11, in other words orthogonally to the force of attraction F1. The weight force FG always acts from top to bottom, in other words in the direction of the force of gravity. If for example the active vibration damper is oriented as shown in FIGS. 1 and 2, the weight force FG acts in the same direction as the force of attraction F1. If the vibration damper is upside-down, in other words such that the upper outer wall 3 points downward, the weight force FG acts in the opposite direction to the force of attraction F1. If the vibration damper is disposed on its side, in other words such that the left or the right outer wall 6, 7 points downward, the weight force FG acts in the direction of the double arrow 11. If the vibration damper is turned onto its front or rear side, in other words such that the front or the rear outer wall 4, 5 points downward, the weight force FG acts in a direction which is aligned both orthogonally to the force of attraction F1 and also orthogonally to the pushing force F2.

The weight force FG is proportional to the mass of the secondary part 10. The mass of the secondary part 10 is lower than the total mass of the vibration damper. It can amount to approximately half the total mass of the vibration damper, for example. If according to the above example the total mass of the vibration damper amounts to approximately 20 kg, the mass of the secondary part 10 can amount for example to approximately 9 kg.

In many cases, as shown in FIG. 2, a further primary part 12 is present in addition to the lower primary part 8. The further primary part 12, if present, is fixed to the inside of the upper outer wall 3, for example by means of schematically represented screws 13. The further primary part 12 is referred to below as the upper primary part because it is fixed on the upper outer wall 3. If the upper primary part 12 is present, like the lower primary part 8 it exerts a force of attraction F1' and a pushing force F2' on the secondary part 10. The force of attraction F1'—like the force of attraction F1 of the lower primary part 8—is at least substantially independent from an actuation of the upper primary part 12 and is aligned toward the upper primary part 12. The lower and the upper primary part 8, 12 are preferably matched to one another such that the force of attraction F1 of the lower primary part 8 is greater than the sum of the force of attraction F1' of the upper primary part 12 and the weight force FG. The pushing force F2' of the upper primary part 12, like the pushing force F2 of the lower primary part 8, acts in the direction of the double arrow 11. It is—like the pushing force F2 of the lower primary part 8—dependent on the actuation of the upper primary part 12. As a rule, insofar as the upper primary part 12 is present, both primary parts 8, 12 are actuated in the same manner such that the pushing forces F2, F2' therefore point in the same direction.

In order, on account of the pushing force F2 (or the pushing forces F2, F2'), to also achieve an actual deflection of the secondary part 10, in other words therefore to achieve that the secondary part 10 is displaced in the direction of the double arrow 11 when the lower primary part 8 (or the primary parts 8, 12) are correspondingly impinged on, the secondary part 10 is movably held via a left and a right retaining element 14, 15. The retaining elements 14, 15 are fixed on the inside of the upper outer wall 3 as shown in the representation in FIG. 2. Strictly speaking, the displacement of the secondary part 10 out of its center position therefore also causes a slight movement away from the lower primary part 8. This movement is however negligible.

The retaining elements 13, 14 can be embodied for example as metal sheets as shown in the representation in FIG. 2. A material thickness of the metal sheets is in this case relatively low. It preferably amounts to 1 mm or less, in particular below 0.5 mm. The material thickness can amount to approximately 0.3 mm, for example.

Insofar as the vibration damper is oriented such that the lower outer wall 2 points downward, this represents the entirely problem-free, normal operation of the vibration damper. Insofar as the vibration damper is oriented such that the upper outer wall 3 points downward (the vibration damper is therefore upside-down, so to speak), this type of mounting, although unusual, is uncritical insofar as the abovementioned sizing of the lower primary part 8 or the primary parts 8, 12 is observed. This is because the force of attraction F1 of the lower primary part 8 then exceeds the weight force FG or the sum of the weight force FG and the force of attraction F1'. Insofar as the vibration damper is oriented such that the left or the right outer wall 6, 7 point downward, this type of mounting is also uncritical. When actuating the primary part 8 or the primary parts 8, 12, it is merely necessary to consider that an offset to compensate the weight force FG is required in addition to the actuation needed to damp the vibration. If, on the other hand, the front or the rear outer wall 4, 5 point downward, this is a critical case. The object of the present invention is to also enable a mounting of this type.

The case in which the vibration damper is oriented such that the rear outer wall 5 points downward will be explained below in connection with FIGS. 3 and 4. Similar statements apply if, conversely, the front outer wall 4 should point downward.

Figure 3:
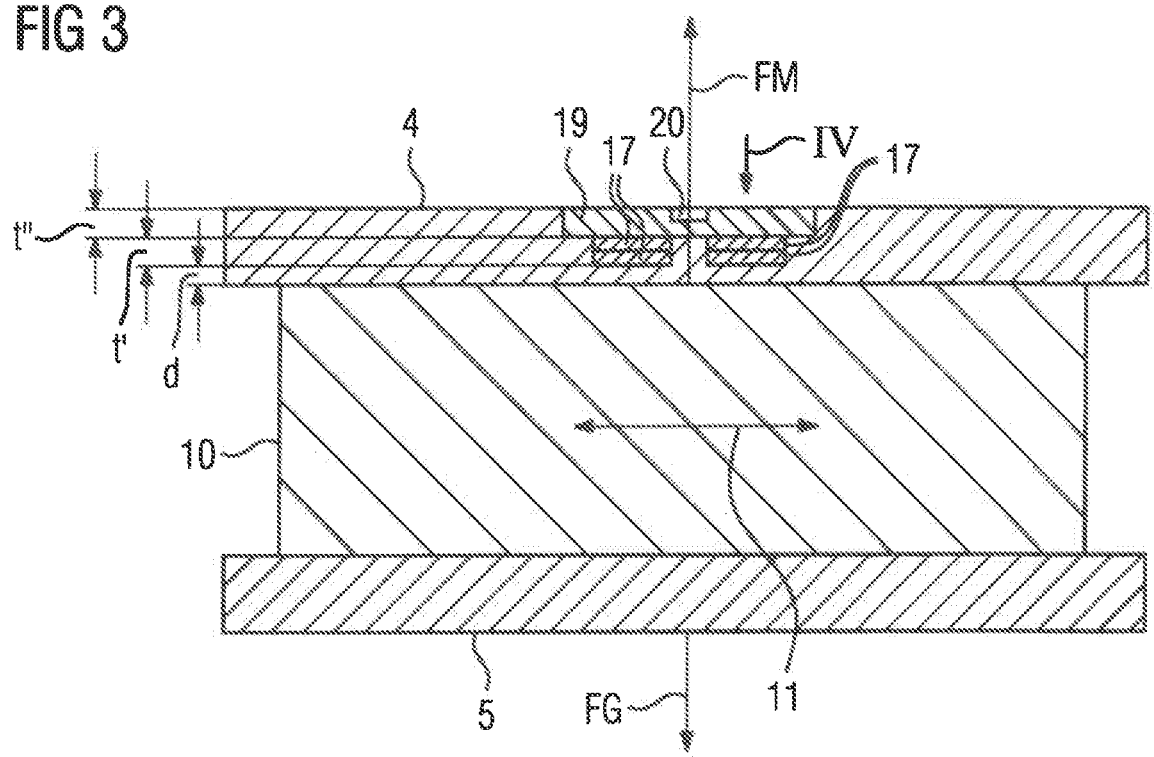
FIG. 3 shows a sectional view through the vibration damper from FIG. 1.
Figure 4:
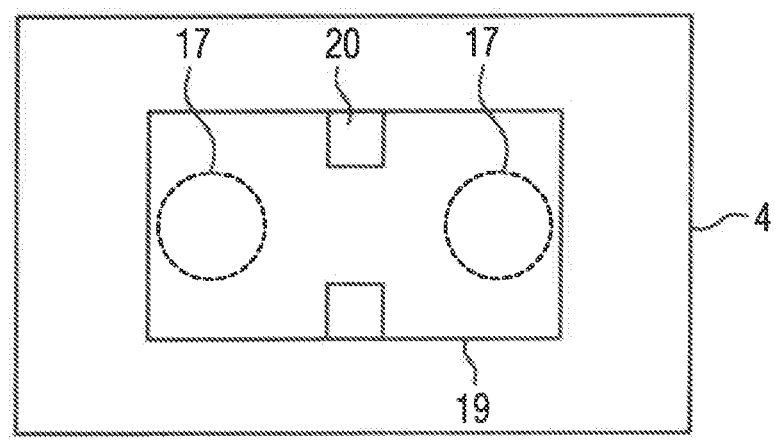
FIG. 4 shows a top view onto the front outer wall from a direction IV.

According to the representation in FIGS. 3 and 4, the rear outer wall 5 therefore points downward and consequently the front outer wall 4 points upward. The weight force FG of the secondary part 10 is therefore aligned both orthogonally to the double arrow 11 as well as orthogonally to the force of attraction F1 or to the forces of attraction F1, F1' and toward the rear outer wall 5.

According to the representation in FIGS. 3 and 4, a number of receptacles 16 is introduced into the front outer wall 4 at the height of the secondary part 10. As a minimum, a single receptacle 16 is present. As a rule, however, several receptacles 16 are present, in particular typically two receptacles 16. Permanent magnets 17 are introduced into the receptacles 16. For the sake of clarity, the receptacles 16 are not shown in FIG. 1.

According to the representation in particular in FIG. 3, the receptacles 16 are introduced into the outside of the front outer wall 4. The receptacles 16 are furthermore designed in a pot-like manner such that a material thickness therefore remains in the region of the pot bases. In particular, the receptacles 16 can be embodied as pot boreholes. In this case, the receptacles 16 have a round cross-section, in particular a circular cross-section. The receptacles 16 can however also have another cross-section, for example an elliptical cross-section, a rectangular cross-section or a hexagonal cross-section. It is decisive that the receptacles 16 have a closed pot base, in other words do not pierce through the front outer wall 4. The remaining material thickness d can be determined as required. It can for example amount to between 1 mm and 2 mm, in particular approximately 1.5 mm. Likewise—in the case of pot boreholes—a suitable diameter D of the pot boreholes can be determined. The diameter D can for example amount to approximately 25 mm. A suitable depth t' of the receptacles 16 can likewise be determined. It can amount to approximately 5 mm, for example.

Furthermore, a further receptacle 18 is introduced into the front outer wall 4 at the height of the secondary part 10, The receptacle 18, too, is introduced into the outside of the front outer wall 4. A magnetic back iron yoke 19 is introduced into the further receptacle 18. The back iron yoke 19 is used to close the magnetic circuit, which is also formed by the permanent magnets 17 and the secondary part 10. The receptacle 18 for the back iron yoke 19 is preferably arranged outside the receptacles 16 for the permanent magnets 17 when viewed from the inside out according to the representation in FIGS. 3 and 4. For the sake of clarity, the receptacles 18—like the receptacles 16—are not shown in FIG. 1.

The further receptacle 18 can have for example a depth t" of 3 mm to 4 mm, in particular of approximately 3.5 mm. In connection with the abovementioned material thickness of the outer walls 2 to 7 and the depth t' of the receptacles 16 for the permanent magnets 17, the depth t" of the further receptacle 18 results in the desired remaining material thickness d.

On account of the closed magnetic circuit, the permanent magnets 17 exert a magnetic force of attraction FM on the secondary part 10. The magnetic force of attraction FM is determined such that it compensates the weight force FG of the secondary part 10 as effectively as possible. The more precise the compensation, the better. To achieve a precise compensation, a resulting magnetic field strength of the magnetic circuit formed by the secondary part 10, the permanent magnets 17 and the back iron yoke 19 is limited by the back iron yoke 19. In this case, the magnetic force of attraction FM remains unchanged, even if slightly stronger or slightly weaker permanent magnets 17 are used. In this case, too, the magnetic force of attraction FM within certain boundaries does not depend on whether the secondary part 10 has a slightly greater or slightly smaller spacing from the inside of the front outer wall 4.

In order to achieve such a consistency of the magnetic force of attraction FM, the back iron yoke 19 preferably has a tapered region 20, in other words a region having a reduced cross-section compared to the remaining back iron yoke 18. In this case, the cross-section of the tapered region 20 can be dimensioned such that the magnetic circuit in the tapered region 20 reaches saturation.

The permanent magnets 17 and the back iron yoke 19 do not have to be present in all cases. In particular, they need only be present if the vibration damper is to be arranged such that the rear outer wall 5 points downward. In the event that the vibration damper has a different orientation, the receptacles 16, 18 are therefore present according to the representation in FIGS. 5 and 6 but the permanent magnets 17 and the back iron yoke 19 are not arranged in the receptacles 16, 18. In this case, the receptacles 16, 18 can for example remain visible or can be provided with a cover or a magnetically inactive filler element.

As already mentioned, similar embodiments are possible in the event that the vibration damper is to be oriented such that the front outer wall 4 points downward and consequently the rear outer wall 5 points upward. These embodiments, to the extent that the receptacles 16, 18 are concerned, can be realized alternatively or in addition as required. To the extent that the permanent magnets 17 and the back iron yoke 19 are concerned, these elements—in the corresponding orientation of the vibration damper—are either not present at all or alternatively arranged in the front or the rear outer wall 4, 5.

Embodiments have hitherto been explained in which one of the outer walls 2 to 7 points directly downward such that four of the six outer walls 2 to 7 therefore run vertically and the two remaining outer walls 2 to 7 are oriented horizontally. In a suitable configuration of the permanent magnets 17 and the back iron yoke 19, it is however even possible to orient the vibration damper such that four or even all six outer walls 2 to 7 form an angle with the vertical which is different from both 0° and also from 90°. In this case, only in particular the tapered region 20 of the back iron yoke 19 must be configured accordingly. If necessary, different back iron yokes 19 can be provided for different orientations such that—depending on the orientation—the suitable back iron yoke 19 can be used.

In summary, the present invention therefore relates to the following subject matter:

An active vibration damper has a substantially cuboid housing 1, such that the housing 1, when positioned with a lower outer wall 2 on the floor, additionally has an upper outer wall 3, a front and a rear outer wall 4, 5 and a left and a right outer wall 6, 7. A primary part 8 of an electrical linear actuator is fixed at least on the inside of the lower outer wall 2. The primary part 8 acts on a secondary part 10 of the electrical linear actuator, arranged above the primary part 8. The secondary part 10 is movably held on the left and right via a retaining element 14, 15 in each case, fixed to the inside of the upper outer wall 3, such that the secondary part 10 is displaceable in a substantially linear manner when the primary part 8 is correspondingly impinged on in the left-right direction. A number of receptacles 16 for permanent magnets 17 and, furthermore, a receptacle 18 for a magnetic back iron yoke 19 are introduced into the front outer wall 4 and/or into the rear outer wall 5 at the height of the secondary part 10. The receptacles 16, 18 are introduced into the outside of the front and/or the rear outer wall 4, 5. The receptacles 16 for the permanent magnets 17 are designed in a pot-like manner, such that the corresponding outer wall 4, 5 is retained as a closed outer wall despite the receptacles 16 for the permanent magnets 17.

The present invention has many advantages. In particular, the vibration damper can be mounted on a machine in each of its basic orientations (in other words one of the outer walls 2 to 7 points downward) and fulfill its function there.

Although the invention has been illustrated and described in greater detail with the preferred exemplary embodiment, the invention is not restricted by the examples disclosed and other variations can be derived therefrom by the person skilled in the art without departing from the protective scope of the invention.

What is claimed is:

1. An active vibration damper, comprising:
   a substantially cuboid housing having a lower outer wall for placement on a floor, an upper outer wall, a front outer wall, a rear outer wall, a left outer wall, and a right outer wall, with at least one of the front and rear outer walls including first and second receptacles in an outer side of the at least one of the front and rear outer walls, with the first receptacle having a pot-shaped configuration such that the at least one of the front and rear outer walls maintains a closed configuration despite the presence of the first receptacle;
   an electrical linear actuator including a primary part which is fixed at least on an inside of the lower outer wall, and a secondary part arranged above the primary part and acted upon by the primary part;
   left and right retaining elements fixed to an inside of the upper outer wall and configured to movably hold the secondary part for displacement in a substantially linear manner in a left-right direction when the primary part is correspondingly impinged on;
   a permanent magnet received in the first receptacle at a height of the secondary part;
   a magnetic back iron yoke received in the second receptacle at the height of the secondary part.

2. The vibration damper of claim 1, wherein the second receptacle for the back iron yoke, when viewed from inside out, is arranged outside the first receptacle for the permanent magnet.

3. The vibration damper of claim 1, wherein the permanent magnet and the back iron yoke are received in the first and second receptacles of the at least one of the front and rear side walls such that a resulting magnetic field strength of a magnetic circuit formed by the secondary part, the permanent magnet and the back iron yoke is limited by the back iron yoke.

4. The vibration damper of claim 3, wherein the back iron yoke has a region of reduced cross-section compared to a remaining region of the back iron yoke to limit the resulting magnetic field strength.

* * * * *